United States Patent
Bloom

[11] Patent Number: 5,700,863
[45] Date of Patent: Dec. 23, 1997

[54] POLYIMIDE POLYMERIC BLENDS

[75] Inventor: Joy Sawyer Bloom, Wilmington, Del.

[73] Assignee: E. I. Du Pont de Nemours and Company, Wilmington, Del.

[21] Appl. No.: 697,048

[22] Filed: Aug. 19, 1996

[51] Int. Cl.⁶ .................................................. C08L 79/08
[52] U.S. Cl. ........................... 524/406; 524/538; 525/180
[58] Field of Search .......................... 525/180; 524/406, 524/538

[56] References Cited

U.S. PATENT DOCUMENTS

| | | | |
|---|---|---|---|
| 3,179,614 | 4/1965 | Edwards | 260/30.2 |
| 3,356,760 | 12/1967 | Matroy | 525/180 |
| 4,144,284 | 3/1979 | Semanaz et al. | 525/180 |
| 4,169,933 | 10/1979 | Jackson, Jr. et al. | 528/190 |
| 4,219,461 | 8/1980 | Calundann | 260/40 P |
| 4,238,600 | 12/1980 | Jackson, Jr. et al. | 528/193 |
| 4,242,496 | 12/1980 | Jackson, Jr. et al. | 528/190 |
| 4,599,383 | 7/1986 | Satoji | 525/180 |
| 4,622,384 | 11/1986 | Manwiller | 528/353 |
| 4,879,362 | 11/1989 | Morgan | 526/247 |
| 5,045,600 | 9/1991 | Giatras et al. | 525/180 |
| 5,135,990 | 8/1992 | Bookbinder et al. | 525/425 |
| 5,346,969 | 9/1994 | Kaku | 525/432 |
| 5,470,922 | 11/1995 | Kaku et al. | 525/436 |

FOREIGN PATENT DOCUMENTS

| | | | |
|---|---|---|---|
| 0430640 | 6/1991 | European Pat. Off. . | |
| 2-206638 | 8/1990 | Japan | 525/180 |
| 3-116153 | 5/1991 | Japan . | |

*Primary Examiner*—Ana Woodward
*Attorney, Agent, or Firm*—Lisa J. Moyles

[57] ABSTRACT

New polyimide polymeric blends which are environmentally friendly during compounding and give improved coefficient of friction in shaped articles prepared therefrom are provided by blending polyimides which are at least 90% imidized and substantially solvent free and have a mean particle size of about 30 μm or less with at least one melt processible thermoplastic liquid crystalline polymer or polyamide and a lubricant.

6 Claims, No Drawings

POLYIMIDE POLYMERIC BLENDS

BACKGROUND OF THE INVENTION

The present invention relates to blends of polyimides having a controlled particle size with thermoplastic polymers and a lubricant.

There are several examples in the literature of thermoplastic and polyimide blends having improved properties. For the most part the polyimide in these blends is thermoplastic. Such is the case in U.S. Pat. No. 5,135,990 and EP 0 430 640 A1.

Where the polyimide of the prior art is in the form of polyamic acid it will generally contain solvent. Commonly the solvent content can be from 10–30 weight percent. The presence of more than very small amounts of solvent results in the release of volatiles during the completion of the imidization reaction and creates environmental problems during processing.

It is desirable for environmental purposes to eliminate polyamic acid containing solvents from polyimide polymers and utilize a fully imidized polyimide or one having a high degree of imidization. By using the present invention, superior properties can be attained using polyimides which are at least about 90% imidized or are fully imidized.

SUMMARY OF THE INVENTION

New polyimide polymeric blends which are environmentally friendly during compounding and give shaped articles which exhibit an improved coefficient of friction are provided by blending particulate polyimides which are substantially solvent free, have a controlled particle size and which are at least about 90% imidized with at least one melt processible thermoplastic polymer and a lubricant. By substantially solvent free it is meant that the solvent content is not greater than about 1 weight percent. More particularly, from about 5 to 40% by weight of a particles of a solvent free polyimide having a mean particle size of about 30 μm or less prepared from at least one aromatic diamine and at least one aromatic dianhydride in which at least about 90% of the polymeric units are converted to polyimide are blended with from about 40 to 93 weight % of at least one non-fluorine containing thermoplastic polymer which is melt processible at a temperature of less than about 400° C. and from about 2 to 40% by weight of a lubricant such as tetrafluoroethylene polymers and copolymers (hereinafter referred to as PTFE), graphite or molybdenum disulfide or combinations thereof. Preferably, at least 25% of the polyimide particles should have a size less than 20 μm, and the compositions contain from about 8–24 weight % polyimide and from about 56–72 weight % thermoplastic polymer. In order to achieve the benefits of this invention the particle size of the polyimide must be preserved during processing and retained in the shaped articles.

DETAILED DESCRIPTION

A wide variety of polyimide resins which have a particle size about 30 μm or less and which are at least 90% imidized can be used in the present invention. Aromatic polyimides, such as those described in U.S. Pat. Nos. 3,179,614 and 4,622,384 can be used. Certain of those polyimides have been found to be particularly satisfactory in the present invention, namely, those having a rigid polymeric structure. Representative of such rigid polymeric materials are those prepared using aromatic diamines and anhydrides such as m-phenylene diamine (MPD); bis-4,4'(3 aminophenoxy) biphenyl; 3,4-oxydianiline (3,4-ODA); oxydianiline (ODA); p-phenylene diamine (PPD); benzophenone-3,3',4,4'-tetracarboxylic dianhydride (BTDA); bis phenol-A-diphthalicanhydride (BPADA); pyromellitic dianhydride (PMDA); and 3,3'4,4'-biphenyltetracarbocyclic dianhydride (BPDA). The dianhydride and the aromatic diamine may be reacted in substantially equimolar quantities. However, excesses of dianhydride or diamine can be used to beneficially modify the properties of the final polyimide. The reaction product of the dianhydride and the aromatic diamine is a polyimide precursor resin, containing a limited amount of polyamic acid which can be thermally or chemically converted to polyimide according to known techniques. Polyimide particles having a mean particle size of about 30 μm or less can be prepared from polyimides having larger sizes by grinding and classifying the larger sized polyimides.

At least one non-fluorine containing polymer which is melt processible at temperatures of less than about 400° C. can be blended with the polyimide resin. Melt processible is used in its conventional sense, that the polymer can be processed in extrusion apparatus at the indicated temperatures without substantial degradation of the polymer. A lubricant is included in the blending operation.

Polyamides which can be used include nylon 6, nylon 6,6, nylon 610, nylon 612 and aromatic polyamides. Polyesters include polybutylene terephthalate and polyethylene terephthalate.

The melt processible polyesters are preferably in the form of liquid crystalline polymers (LCPs). The LCPs are generally polyesters including, but not limited to polyesteramides and polyesterimides. LCPs are described in Jackson et al. in U.S. Pat. Nos. 4,169,933, 4,242,496, and 4,238,600, as well as in "Liquid Crystal Polymers: VI Liquid Crystalline Polyesters of Substituted Hydroquinones", Contemporary Topics in Polymer Science, 1984, Vol. 5, pp. 177–208. Others are described in Calundann, U.S. Pat. No. 4,219,461. Particularly desirable LCPs are prepared from monomers such as phenyl hydroquinone, hydroquinone, t-butyl hydroquinone, 1,4-benzene dicarboxylic acid, 1,3-benzene dicarboxylic acid, 4-hydroxybenzoic acid and 2,6-napthalene dicarboxylic acid in varying ratios.

One or more of known lubricants for polyimide compositions may be used in the compositions of this invention such as, graphite, molybdenum disulfide or PTFE. Non-fibrillating tetrafluoroethylene polymers and copolymers such as tetrafluoroethylene/hexafluoropropylene are also useful and are commercially available in micropowder form. E. I. du Pont de Nemours and Company sells such materials under its trademark, Teflon® MP. Preparation of copolymers of tetrafluoroethylene is described in Morgan U.S. Pat. No. 4,879,362.

The present polymeric compositions may include additives in addition to a lubricant, such as calcium carbonate, glass beads, zinc oxide, and fiber reinforcements such as ceramic fibers, aramid fibers, potassium titanate fibers, glass fibers and carbon fibers. The particular additive selected will depend on the effect desired.

High performance shaped articles are formed from the polymeric blends of this invention by a suitable molding operation such as injection or compression molding. Molding conditions must be selected to prevent coalescing or degrading the polyimide particles thereby preserving their integrity in the shaped article.

The present invention is further illustrated by the following Examples in which parts and percentages are by weight unless otherwise indicated. In the Examples wear specimens were prepared by machining test blocks of the composition described. A 6.35 mm (0.25") wide contact surface of a wear/friction test block was machined to such a curvature that it conformed to the outer circumference of a 35 mm (1.38") diameter X 8.74 mm (0.34") wide metal mating ring. The blocks were oven dried and maintained over desiccant until tested.

Wear tests were performed using a Falex No. 1 Ring and Block Wear and Friction Tester. The equipment is described in ASTM Test method D2714. After weighing, the dry block was mounted against the rotating metal ring and loaded against it with the selected test pressure. Rotational velocity of the ring was set at the desired speed. No lubricant was used between the mating surfaces. The rings were SAE 4620 steel, Rc 58–63, 6–12 RMS. A new ring was used for each test. Test time was 24 hours, except when friction and wear were high, in which case the test was terminated early. The friction force was recorded continuously. At the end of the test time, the block was dismounted, weighed, and the wear calculated by the following calculation:

Wear Volume Calculation wear volume(cc/hr)=weight loss(grams)

material density(g/cc)X test duration(hr)

A low number is desired for Wear Volume and a low number or narrow range is desired for the Coefficient of Friction. Coefficient of Friction appears to be directly correlated to the particle size of the polyimide in the polymer matrix.

Particle size was determined through the use of a Coulter LS 130 Laser Diffraction Analyzer. A garnet standard of 109 µm and a Fraunhoffer (Optical Model) was used.

Tensile properties were measured according to ASTM D638, and flexural properties were measured according to ASTM D-790.

EXAMPLES

| Type | Method Used to Prepare | Monomers | Mean Particle Size (µm) |
|------|------------------------|----------|-------------------------|
| A | US 4,622,614 | ODA/PMDA | 75.4 |
| B | US 4,622,614 | ODA/PMDA | 75.4 |
| C | US 3,179,384 | ODA/PMDA | 29.6 |
| D | US 3,179,384 | ODA/PMDA | 29.6 |
| E |  | ODA/BTDA | 23.8 |

SUMMARY OF POLYIMIDES USED IN EXAMPLES (averages of several samples)

Example 1 (Comparative)

56 parts of a liquid crystalline polyester (DuPont Zenite®6000) was blended with 20 parts PTFE (DuPont Teflon®MP-1600 micropowder and with 24 parts of polyimide resin prepared from pyromellitic dianhydride and 4,4'-oxydianiline present as its precursor, polyamic acid, (this polyimide type is referred to as "A") having a mean particle size of 75 µm, or with 24 parts of fully imidized polyimide resin prepared in the same manner having a mean particle size of 75 µm (this polyimide type is referred to as "B"). The blending was accomplished using a 30 mm twin screw extruder with barrels set to 290° C. and the die at 335° C. having vent ports in zones 4, 6 and 8. Quenching was accomplished using a water spray. The strand was cut into pellets using a standard rotating blade cutter. The pellets were molded into standard 6.4 mm thick ASTM (D638) tensile test bars using a 170 g capacity, 145 ton clamping pressure injection molding machine. The profile was as follows: Rear 313° C., Center 334° C., Front 335° C. and Nozzle 332° C., Boost 1 sec, Injection 20 sec, Hold 20 sec, Injection Pressure 3.4 MPa, Ram Speed fast, Screw Speed 107 rpm and Back Pressure minimum.

The samples were made into the test specimens by machining. Wear testing was done at a PV of 1.75 MPa-m/s (1.28 MPa, 1.36 m/s)

| Sample No | Polyimide Type | Wear Volume cc × $10^{-4}$/hr | Coefficient of Friction | Tensile Strength (MPa) | Elong. (%) | Flexural Strength (MPa) | Flexural Modulus (MPa) |
|-----------|----------------|-------------------------------|-------------------------|------------------------|------------|-------------------------|------------------------|
| I | A* | 25.7 | 0.21–0.33 | 42.6 | 2.5 | 71.4 | 4013 |
| II | B | 24.9 | 0.23–033 | 40.7 | 2.3 | 71.9 | 4079 |

*Solvent content 25.05 weight %

Example 2

The same method for sample preparation as used in Example 1 was utilized except that one of the polyimides used were prepared from polyimide pyromellitic dianhydride and 4,4'-oxydianiline having an imidization level of about 90% and a mean particle size of 30 µm (polyimide type "C"), and type "D" had a imidization level >99.9% and a mean particle size of 30 µm.

| Sample No | Polyimide Type | Wear Volume cc × 10⁻⁴/hr | Coefficient of Friction | Tensile Strength (MPa)0.7 hr | Elong. (%) | Flexural Strength (MPa) | Flexural Modulus (MPa) |
|---|---|---|---|---|---|---|---|
| III | C | 5.0 | 0.25–0.32 | 68.5 | 3.2 | 91.4 | 5054 |
| IV | D | 3.7 | 0.24–0.27 | 47.0 | 2.6 | 70.3 | 4308 |
| V | A* | 5.9 | 0.28–0.33 | 46.7 | 2.4 | 70.7 | 4188 |

*Solvent content 24.19 weight %

Example 3

The same method for sample preparation as used in Example 2 was utilized except that DuPont's Zenite®7000 liquid crystalline polymer was utilized in place of Zenite®6000 and 10 parts zinc oxide additive (obtained from Matsushita as WZ-511 powder) having a starting mean particle size of 2.1 μm and 10 parts PTFE (DuPont Teflon®MP-1600 micropowder were utilized. The polyimides used were types "A", "C" and "E". "E" was prepared from benzophenone -3,3',4,4'-tetracarboxylic dianhydride and 4,4'-oxydianiline present as >90% imidized having a mean particle size of 24 μm. The amount of LCP and Polyimide used are documented in the table below:

| Sample No | Parts LCP | Polyimide Type | Parts polyimide | Wear Volume cc × 10⁻⁴/hr | Coefficient of Friction |
|---|---|---|---|---|---|
| VI | 72 | C | 8 | 2.8 | 0.22–0.26 |
| VII | 64 | C | 16 | 4.6 | 0.22–0.27 |
| VIII | 56 | C | 24 | 5.9 | 0.22–0.24 |
| IX | 72 | D | 8 | 4.7 | 0.18–0.25 |
| X | 64 | D | 16 | 5.5 | 0.22–0.28 |
| XI | 56 | D | 24 | 5.9 | 0.21–0.26 |
| Comparison | 56 | A | 24 | 5.0 | 0.20–0.29 |

Example 4

56 parts of thermoplastic Polyamide (DuPont Zytel®HTN) were blended with 10 parts zinc oxide additive (obtained from Matsushita as WZ-511 powder) having a starting mean particle size of 2.1 μm, 10 parts PTFE (DuPont Teflon®MP-1600 micropowder) and 24 parts polyimide resin. This was accomplished using a 30 mm twin screw extruder with barrels set to 320° C. and the die at 335° C. Quenching was accomplished using a water spray. The strand was cut into pellets using a standard rotating blade cutter. The pellets were molded into standard 6.4 mm thick ASTM (D638) tensile test bars using a 170 g capacity, 145 ton clamping pressure interjection molding machine. The profile was as follows: Rear 315° C., Center 335° C., Front 335° C. and Nozzle 335° C.; Boost 0.5 sec, Injection 20 sec, Hold 20 sec, Injection Pressure 4.8 MPa, Ram Speed fast, Screw Speed 120 rpm an 0.34 MPa Back Pressure.

| Sample No | Polyimide Type | Wear Volume cc × 10⁻⁴/hr | Coefficient of Friction | Tensile Strength (MPa) | Elong. (%) | Flexural Strength (MPa) | Flexural Modulus (MPa) |
|---|---|---|---|---|---|---|---|
| XI | E | 3.3 | 0.09–0.22 | 51.0 | 2.2 | 109.8 | 2983 |
| XIII | A* | 2.9 | 0.11–0.33 | 37.2 | 1.7 | 90.7 | 2717 |

*Solvent content 21.56 weight %

What is claimed is:

1. A polymeric blend comprised of
   (a) from about 5 to 40% by weight of particulate polyimide which maintains its particulate form at temperatures of less than 400° C. having a mean particle size of about 30 μm or less which is at least about 90% imidized,
   (b) from about 40 to 93% by weight of at least one non-fluorine containing thermoplastic polymer which is melt processible at temperatures of less than about 400° C., and
   (c) from about 2 to 40% by weight of a lubricant,, such that the amount of components (a), (b) and (c) together make up 100% by weight.

2. The composition of claim 1 wherein said thermoplastic polymer is a liquid crystalline polymer.

3. The composition of claim 1 wherein said thermoplastic polymer is a polyamide.

4. The composition of claim 1 where from about 8 to 24% by weight of said polyimide particles and from about 56 to 72% by weight of said thermoplastic polymer are present in said composition.

5. The composition of claim 1 wherein said lubricant is a tetrafluoroethylene polymer or copolymer of tetrafluoroethylene.

6. A shaped article having enhanced coefficient of friction prepared from the composition of claim 1 wherein the mean particle size of the polyimide in the shaped article is about 30 μm or less.

* * * * *